United States Patent
Waters, Jr. et al.

(10) Patent No.: US 10,435,906 B2
(45) Date of Patent: *Oct. 8, 2019

(54) FLOOD PROTECTION FOR UNDERGROUND AIR VENTS

(71) Applicant: Floodbreak, L.L.C., Houston, TX (US)

(72) Inventors: Louis A. Waters, Jr., Bellaire, TX (US); Nick Adam Eastman, Georgetown, TX (US)

(73) Assignee: Floodbreak, L.L.C., Bellaire, TX (US)

( * ) Notice: Subject to any disclaimer, the term of this patent is extended or adjusted under 35 U.S.C. 154(b) by 158 days.

This patent is subject to a terminal disclaimer.

(21) Appl. No.: 15/650,415

(22) Filed: Jul. 14, 2017

(65) Prior Publication Data

US 2017/0343237 A1    Nov. 30, 2017

Related U.S. Application Data

(63) Continuation-in-part of application No. 14/506,778, filed on Oct. 6, 2014, now Pat. No. 9,752,342.
(Continued)

(51) Int. Cl.
*E04H 9/14* (2006.01)
*E02D 19/02* (2006.01)
(Continued)

(52) U.S. Cl.
CPC ............. *E04H 9/145* (2013.01); *E02D 19/02* (2013.01); *E05F 1/02* (2013.01); *E06B 9/04* (2013.01);
(Continued)

(58) Field of Classification Search
CPC ...... E04H 9/145; E05Y 2800/428; E21F 1/08; E21F 1/16; E21F 17/103; E21F 17/12; E02D 19/02
See application file for complete search history.

(56) References Cited

U.S. PATENT DOCUMENTS

| 231,544 A | 8/1880 | Darst |
| 930,829 A | 8/1909 | Bolling |

(Continued)

FOREIGN PATENT DOCUMENTS

| CN | 201962783 | 9/2011 |
| CN | 102392686 | 3/2012 |

(Continued)

OTHER PUBLICATIONS

Search History PCT/US2017/042214.
(Continued)

*Primary Examiner* — Catherine A Kelly
(74) *Attorney, Agent, or Firm* — Tim L. Burgess, P.C.

(57) ABSTRACT

Apparatus allowing ventilation through a ventilation shaft to an underground ventilation duct fluidly communicating through the ventilation shaft to an atmospheric opening of the shaft and on threat of flooding operable to prevent downward flow of surface water into the underground ventilation duct includes one or more hinged panels closing a ventilation passage between the top and bottom of a support fitting in the shaft to prevent flooding. The panels have handles on their topside and pivotable arms on their underside and are liftable to an upright home position allowing ventilation, using tools to reach through grating covering openings on the shaft and lift the panel handles and after the panels are partially lifted, using reach tools to engage and lift the arms to press them again support sidewalls to exert lateral force on underside of the panels to complete upward rotation to the home position.

15 Claims, 13 Drawing Sheets

Related U.S. Application Data

(60) Provisional application No. 62/363,024, filed on Jul. 15, 2016, provisional application No. 61/887,416, filed on Oct. 6, 2013.

(51) Int. Cl.
| | | |
|---|---|---|
| *E21F 1/08* | (2006.01) | |
| *E06B 9/04* | (2006.01) | |
| *E05F 1/02* | (2006.01) | |
| *E06B 5/01* | (2006.01) | |
| *E06B 9/00* | (2006.01) | |

(52) U.S. Cl.
CPC ............. *E21F 1/08* (2013.01); *E05Y 2800/11* (2013.01); *E05Y 2800/252* (2013.01); *E05Y 2800/428* (2013.01); *E05Y 2900/60* (2013.01); *E06B 5/01* (2013.01); *E06B 2009/007* (2013.01); *Y02A 50/14* (2018.01)

(56) References Cited

U.S. PATENT DOCUMENTS

| | | | | |
|---|---|---|---|---|
| 1,556,328 | A * | 10/1925 | Hutchins | E02B 13/00 160/85 |
| 1,715,903 | A | 12/1925 | Dame | |
| 2,586,967 | A | 2/1952 | Lundy | |
| 2,741,972 | A | 4/1956 | Pryne | |
| 4,073,147 | A | 2/1978 | Nomura | |
| 4,474,167 | A | 10/1984 | McCabe | |
| 4,503,881 | A * | 3/1985 | Vecchio | E03F 7/04 137/425 |
| 5,201,685 | A * | 4/1993 | Raisanen | A01K 1/0058 454/259 |
| 5,711,343 | A | 1/1998 | Beckett | |
| 5,924,922 | A * | 7/1999 | Eakin | A01K 1/0058 454/256 |
| 5,980,381 | A | 11/1999 | McCormick | |
| 6,287,050 | B1 | 9/2001 | Montgomery et al. | |
| 6,533,656 | B2 * | 3/2003 | Hertel | F24F 13/1406 454/259 |
| 6,623,209 | B1 | 9/2003 | Waters, Jr. | |
| 6,685,557 | B1 * | 2/2004 | Hoffe | F24F 13/06 137/527.8 |
| 7,435,035 | B2 | 10/2008 | Cullen | |
| 7,467,911 | B2 | 12/2008 | Flury | |
| 7,600,944 | B1 * | 10/2009 | Keating | E04H 9/145 405/96 |
| 7,814,705 | B2 * | 10/2010 | Reed | E06B 9/04 49/31 |
| 7,926,539 | B1 | 4/2011 | Hurst | |
| 7,972,081 | B2 * | 7/2011 | Linares | E02B 3/104 405/105 |
| 8,033,753 | B2 * | 10/2011 | Waters, Jr. | E21F 1/08 405/96 |
| 9,004,814 | B2 * | 4/2015 | Petrillo | F24F 13/14 137/403 |
| 9,279,224 | B2 * | 3/2016 | Waters, Jr. | E02B 3/104 |
| 9,303,423 | B2 * | 4/2016 | Cadogan | E06B 9/13 |
| 9,315,965 | B1 * | 4/2016 | Adler | E04H 9/14 |
| 9,752,342 | B2 * | 9/2017 | Waters, Jr. | E05F 1/02 |
| 10,106,945 | B2 * | 10/2018 | Waters, Jr. | F24F 11/89 |
| 2008/0016780 | A1 | 1/2008 | McDougle et al. | |
| 2009/0185864 | A1 * | 7/2009 | Waters, Jr. | E21F 1/08 405/96 |
| 2009/0189404 | A1 | 7/2009 | Anderson | |
| 2011/0154563 | A1 | 6/2011 | Ball | |
| 2013/0209173 | A1 | 8/2013 | Quek | |
| 2014/0241804 | A1 | 8/2014 | Petrillo | |
| 2014/0242902 | A1 * | 8/2014 | Ali | F24F 13/14 454/359 |
| 2015/0133042 | A1 * | 5/2015 | Pearce | F24F 13/08 454/184 |
| 2016/0097212 | A1 | 4/2016 | Waters, Jr. | |
| 2018/0128002 | A1 * | 5/2018 | Quek | E04H 9/145 |

FOREIGN PATENT DOCUMENTS

| | | |
|---|---|---|
| DE | 202005012770 A1 | 7/2006 |
| EP | 2314356 | 4/2011 |
| JP | H04266037 | 2/1987 |
| JP | H10140592 | 5/1998 |
| JP | 2008133708 | 6/2008 |
| JP | 2005061201 | 3/2009 |
| JP | 4873498 | 2/2010 |
| KR | 200192098 | 8/2000 |
| KR | 2020020013062 | 4/2002 |
| KR | 200280864 | 6/2002 |
| KR | 1020100074363 | 7/2010 |
| KR | 20100123473 | 11/2010 |

OTHER PUBLICATIONS

International Search Report PCT/US2017/042214.
Witten Opinion of the International Searching Authority PCT/US2017/042214.
Translation of EP2314356, Schwenzer, Apr. 27, 2011.
Translation of JP2008133708A, Sadahito, Jun. 12, 2008.
Translation of JPH10140592A, Kazuo, May, 26, 1998.
Translation of JP4873498B2, Ito, Feb. 18, 2010.
Translation of KR200192098, Byum, Aug. 16, 2000.
Translation of CN201962783, Lin, Sep. 7, 2011.
Translation of KR2020020013062, Jeon, Apr. 29, 2002.
Translation of CN 102392686, Guisheng, Mar. 28, 2012.
Translation of KR200280864, Chung, Jul. 6, 2002.
Translation of JPH04026037, Masuda, Feb. 3, 1987.
Translation of KR1020080132763, Choi, Jul. 2, 2010.
Viking-F-1-Dry-Valve-Data-Sheet, The Viking Corporation, Mar. 28, 2013.
Round Backdraft Dampers Now Available from Greenheck, Greenheck, May 26, 2018.
Fire Dampers Type: Butterfly 60min, (published prior to Aug. 17, 2016).

* cited by examiner

FLOOD PROTECTION FOR UNDERGROUND AIR VENTS

CROSS REFERENCE TO RELATED APPLICATION

This application is a continuation-in-part of and claims the benefit of U.S. application Ser. No. 14/506,778 filed Oct. 6, 2014, which claimed the benefit of U.S. Provisional Application No. 61/887,416, filed Oct. 6, 2013, as does this application, and further claims the benefit of U.S. Provisional Application No. 62/363,024, filed Jul. 15, 2016, the disclosures of all of which are incorporated herein by reference.

STATEMENT REGARDING FEDERALLY SPONSORED RESEARCH AND DEVELOPMENT

Not applicable

BACKGROUND OF THE DISCLOSURE

Technical Field

This invention relates to blocking flooding water from entering underground ventilation passages.

Background Art

Surface storm waters entering and flooding underground tunnels and chambers through ventilation ducts connecting the underground chambers or tunnels to air at ground surface affect without limitation, underground transportation tunnels for road vehicles, trains, and subways, and underground chambers, such as associated with a complex of connecting tunnels and shafts, for example as used for such things as underground hydroelectric-power plants, or with underground utilities which require ventilation, such as underground transformer rooms.

In a typical subway ventilation arrangement, ventilation ducts or shafts are incorporated into subway systems near stations to exhaust stale pushed air as the train nears a station and to pull in fresh outside air as a train leaves a station, Also reducing the "piston effect" of air being forced through the tunnels at high speeds by moving trains. Typically, a ventilation duct communicates from an underground tunnel and terminates in a ventilation shaft structure below grade level that opens to the atmosphere at grade level such as a sidewalk where the opening is covered by a subway grating.

Subways have systems for handling water. When it rains, water runs down stairwells, onto platforms and thence onto tracks, and some gets in the ventilation systems through the surface gratings. Drains beneath the tracks pipe water to underground sumps in pump rooms next to the subway tracks. Pumps pull the water up to pressure relief manholes open to the atmosphere at street level; from there the water drains under gravity flow into city storm sewers. The problem is that in heavy rains, storm sewers are overwhelmed and flush water back into the streets, flooding the streets with water inundates sidewalk and pours down through subway gratings into the ventilation system thence into the tunnels and onto the tracks. The pumping system can only return water to the flooded street; from there the water reenters the flood pool pouring into the ventilation system, defeating the pumping system as a means of controlling subway flooding. The problem is especially acute in cities like New York and Lower Manhattan, which is low-lying, vulnerable to storm surges and dotted with grade-level gratings, stairwells and other points of entry for running water into the subways.

One solution for reducing entrance of runoff water from sidewalk grating openings through the ventilation ducts down into the underground systems was raising the subway ventilation gratings above sidewalk level, as was done in some locations in New York City in Manhattan, Queens and Brooklyn after flooding from a severe rainstorm in 2007. This not only was costly to implement but also sacrificed much of the available sidewalk area available for pedestrians. In advance of the super storm Sandy in 2013, when predicted storm surge and high tides in addition to heavy rains signaled flooding of subways, workers resorted to sandbags and fastening plywood covers over subway ventilation gratings to try to prevent flooding. Sandy was testament to flood hazards of subways and vented subterranean structures. Fastening plywood covers over large numbers of air vent gratings in a short period of time as a solution is an imperfect labor and materials intensive process and can be too little too late, as was made clear by subway flooding from Sandy. A simpler, faster, relatively inexpensive and more effective method of preventing flooding through sidewalk air vent gratings is needed.

DESCRIPTION OF EMBODIMENTS

Figure 2:
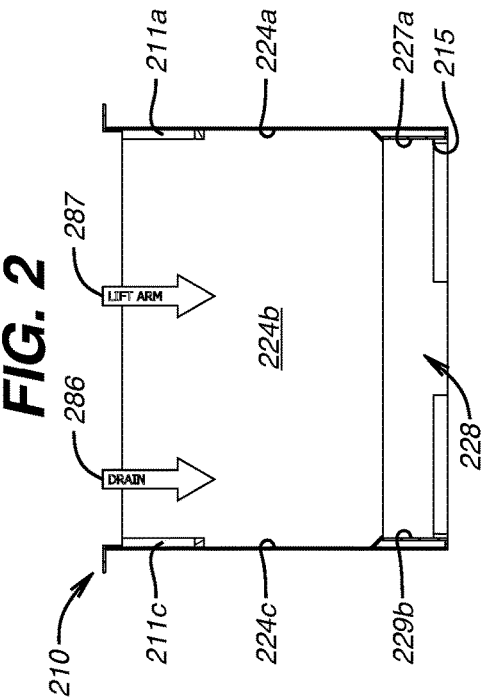
FIG. 2 is a top plan view of the quadrilateral embodiment of FIG. 1.

In accordance with this invention apparatus for installation in a ventilation shaft already fluidly communicating between an atmospheric opening and an underground ventilation duct allows the ventilation when there is no treat of flooding and on threat of flooding is manually operable to close ventilation from the atmospheric opening and prevent downward flow into the underground ventilation duct of surface water entering the atmospheric opening.

The concepts embodied in the exemplary embodiments of such apparatus described herein have application to any system in which an atmospheric opening communicates with a ventilation duct for an underground chamber or tunnel or other underground structure requiring ventilation, and through which opening substantial volumes of water can enter, whether by heavy rain or by storm surge propelled by hurricane or tropical storm or otherwise.

In the descriptions of exemplary embodiments of the invention that follow, reference is made to the accompanying drawings, which form a part hereof and in which are shown, by way of illustration, specific embodiments in which the invention may be practiced. Specific details disclosed herein are in every case a non-limiting embodiment representing concrete ways in which the concepts of the invention may be practiced. This serves to teach one skilled in the art to employ the present invention in virtually any appropriately detailed system, structure or manner consistent with those concepts. It will be seen that various changes and alternatives to the specific described embodiments and the details of those embodiments may be made within the scope of the invention. Because many varying and different embodiments may be made within the scope of the inventive concepts herein described and in the specific embodiments herein detailed, it is to be understood that the details herein are to be interpreted as illustrative and not as limiting.

The various directions such as "upper," "lower," "bottom," "top," "transverse", "perpendicular", "vertical", "horizontal," and so forth used in the detailed description of embodiments are made only with respect to easier explanation in conjunction with the drawings. The components may be oriented differently while performing the same function and accomplishing the same result as the embodiments herein detailed embody the concepts of the invention, and such terminologies are not to be understood as limiting the concepts which the embodiments exemplify.

The term "perpendicular" means substantially at a right angle to a reference to a degree that if not absolutely a right angle will not materially adversely affect the arrangement and function of the element described as perpendicular. The terms "vertical" or "vertically" include but are not limited to literal vertical and generally mean oriented up and down with respect to the earth's horizon to a degree that if not absolutely vertical will not materially adversely affect the function of the element described as vertical. Similarly, the terms "horizontal" or "horizontally" include but are not limited to literal horizontal and generally mean not out of level with respect to the earth's horizon to a degree that will materially adversely affect the function of the element described as horizontal.

As used herein, the use of the word "a" or "an" when used in conjunction with the term "comprising" (or the synonymous "having" or "including") in the claims and/or the specification may mean "one," but it is also consistent with the meaning of "one or more," "at least one," and "one or more than one." In addition, as used herein, the phrase "connected to" means joined to or placed into communication with, either directly or through intermediate components.

For components of described embodiments that are the same, in some cases the first mentioned component is identified by a given reference numeral, and the second such component is the same reference number marked with an apostrophe, for example "panel handle 259" identifies a first mentioned component, and the second such like component is identified as "panel handle 259'". Coupling the two reference numerals separated by a coma, for example "panel handles 259, 259'" means either component "panel holder 259" or "panel handle 259'" is being described unless the context means both are being described together.

For illustrative purposes of an application of the concepts herein disclosed for blocking entrance of water into a ventilation duct, the embodied concepts are described in reference to a specific ventilation environment. The exemplary application is for a subway system. In the specific embodiments described herein as examples, it is assumed the atmospheric opening through which flooding waters enter has a rectilinear shape, as for grating covered grade level sidewalk openings for subway ventilation systems, which at least in New York City typically are rectangular. Although the detailed descriptions of specific embodiments relate to a rectilinear shape and for a particular environment, the invention does not require that the opening be rectilinear or that embodiments of the invention conform to a rectilinear shape or that the atmospheric opening be at grade level. The elements of the invention can be configured to fit within downwardly vertically projected dimensions of any ventilation shaft surface opening serving any underground tunnel, chamber, room or other underground structure, whether rectilinear, circular or oval or some other shape.

In the descriptions of exemplary embodiments that follow, the passage closing position is one in which the panel or panels of the embodiments are horizontal. The concept of the invention is not limited to this disposition. Restrains or stops for stopping panel lowering may be positioned to stop the downward travel above horizontal and still close a ventilation passage. The described embodiments are non-limiting illustrations of examples in which the concepts of the invention may be implemented.

The exemplary embodiments of the invention comprise a ventilation shaft manual closure assembly. Support for the exemplary assembly embodiment includes opposed lateral sidewalls for arrangement in a vertical ventilation shaft to an underground ventilation duct fluidly communicating through the ventilation shaft to an atmospheric opening of the shaft. The atmospheric opening may be cylindrical and the support cylindrical. The atmospheric opening may be rectilinear and the support quadrilateral. As mentioned, in the exemplary embodiments, the atmospheric opening is rectilinear.

The support inclusive of the lateral sidewalls is sized to internally fit in the vertical shaft between the ventilation duct and the atmospheric opening. In an embodiment, the support has horizontal flanges transverse to the sidewalls for projection across a top of the shaft to hang the support in the shaft. The support defines a passage between top and bottom openings of the support for fluid communication of the ventilation duct up through the support to the atmospheric opening.

In an exemplary embodiment, one or more downwardly rotatable panels may be used, mounted in an upright home position not obstructing the ventilation passage that fluidly communicates the underground ventilation duct with the atmospheric opening of the ventilation shaft, to allow ventilation as usual when there is no flooding threat. In one exemplary embodiment, a single panel is mounted in the home position to a side of such a passage to alone gravitationally fall from home position to a passage closing position across the entirety of the passage to protect the underground ventilation duct from flooding. In another exemplary embodiment, a pair of panels is mounted on opposite sides of the passage, to gravitationally fall from home position down toward each other to passage closing positions to combine to close the passage. In yet another exemplary embodiment, a pair of panels is mounted centrally in the passage for rotation of the panels in directions opposite each other from the home position to a lower passage closing position. An advantage of paired panels is that they may be used to close a passage that is wider than it would be feasible for a single taller panel to close.

The manual closure assembly comprises one or more panels having proximal and distal ends, a top side and a bottom side. The proximal end connects with a horizontal hinge having an axis perpendicular to the opposed lateral sidewalls for manual rotation of a panel upwardly to an upright home position not obstructing the passage and rotation from the home position downwardly solely by gravitational impetus of its own weight to reach a lower passage closing position. The one or more panels have a profile that closes the passage when each panel gravitationally rotates to the passage closing position.

At least one restraint limits the downward rotation of each panel to the lower passage closing position. The restraint may be one or more foldable or flexible members anchored at one end to an upper portion of a suspension member (next mentioned) and fastened at the other end to the topside of a panel, or it may comprise one or more stops that do not obstruct the passage and that are located within and connected to the support proximate the bottom opening.

In an exemplary embodiment, adjacent sidewalls include a base having rounded corners with a first radius of curvature and in which the distal portions of the panels have rounded corners with a radius of curvature substantially the same as the first radius of curvature of the sidewall corners they sweep when rotating to the passage closing position. In an exemplary embodiment, the panels include seals for sealing the passage in the passage closing position.

A suspension member unobstructively horizontally spans the passage proximate the support top opening and holds the one or more hinge connected panels in the passage. The suspension member is supported on the opposed lateral sidewalls proximate the support top and bottom openings. The suspension member has at least one handle connected to the suspension member for holding the suspension member to move it vertically into or out from the supports on the opposed lateral sidewalls. The suspension member may comprise a single unitary vertically extending member holding the horizontal hinge and the panels connected to the hinge, or may comprise a beam having vertically hung straps holding the horizontal hinge and the panels connected to the hinge. In an exemplary embodiment, the horizontal hinge comprises a hinge mounting member held by the suspension member and a plurality of hinge members mounted on the hinge mounting member. In an exemplary embodiment, each hinge member comprises a stationary member, a movable member and a hinge pin interconnecting the stationary and movable members, the stationary member connecting to the hinge mounting member, and the moveable hinge member connecting to the proximal end of a panel. The horizontal hinge may also comprise a continuous hinge, sometimes called a piano hinge, or any other hinge for panels.

In an exemplary embodiment, the suspension member is supported centrally between the opposed lateral sidewalls, and suspends a pair of panels in the ventilation passage for rotation of the panels in directions opposite each other from or to said upright home position. In an exemplary embodiment in which the atmospheric opening is rectilinear and said support is quadrilateral, such centrally supported suspension member comprises a beam having vertically hung straps holding the horizontal hinge and the panels connected with said horizontal hinge. In such embodiment, the opposing sidewalls each attach centrally in the ventilation passage adjacent the top opening of the shaft a cradle having a pair of spaced apart parallel vertical bars connecting to and standing upright on a horizontal bar for receiving and supporting the beam within such vertical bars and on the horizontal bar.

In an exemplary embodiment, a panel holder for holding each the panel in the upright home position comprises a latch carried by the suspension member below the suspension member, and a latch catch carried by the panel, the latch capturing and holding the latch catch when the panel is rotated upwardly to the home position. The embodiment further comprises a panel releaser for the panel holder comprising linkage connected to the panel holder carried by the suspension member, the linkage being vertically movable relative to the suspension member to translate the latch to cause it to lose capture of the catch and release the panel from the upright home position, allowing the panel to gravitationally rotationally fall to the lower passage closing position.

In an exemplary embodiment, means are provided for manually rotating the panels to home position, including a panel handle on the top side of the one of more panels for manually rotationally raising the one or more the panels from the passage closing position toward the home position, and a lift arm for each panel, each lift arm having a proximal end pivotally connected by pivot pin to the bottom side of a panel on a pivotation axis parallel to the hinge axis and a distal end optionally comprising a terminal round, suitably a wheel. Each lift arm has a dimension allowing it to contact the terminal round with one of the opposed lateral sidewalls when the distal end is pivoted upward inside the sidewall for exertion of lateral force onto the connected panel being raised with the panel handle to complete rotation of the panel into the home position.

In an exemplary embodiment, the lift arms are spring biased to force the distal ends rotationally outwardly and upwardly. In an exemplary embodiment, a spring is centrally coiled around the lift arm pivot pin. The spring terminates on opposite first and second ends and has a straight portion comprising a proximal shank and a distal portion bent at a right angle to the shank. The distal portion of the first end extends engagingly across an underside of the lift arm proximate the pivot pin and the distal portion of the second end extends engagingly across a topside of the lift arm more distant from the pivot pin than the distal portion of the first end.

In an exemplary embodiment, a releasable stay is provided for each pivot arm. A stay pivot pin adjacent the lift arm pivot pin pivotally connects an upper end of each stay. A lower end of the stay angles outwardly toward an adjacent lift arm to extend across and releasably contact a proximal portion of the top side of the lift arm. The spring bias presses the lift arms against the stays, restraining the lift arms from rotation outwardly and upwardly.

The stay is releasable by a reach tool vertically lowered from the atmospheric opening, allowing the spring biased distal end of the lift arm to pivot laterally outward for capture by the reach tool reach tool vertically lowered from the atmospheric opening.

In an exemplary embodiment each lift arm has a configuration at an bottom portion of the arm for engagement by a reach tool vertically lowered from the atmospheric opening to engage and pivotally pull the stay released lift arm upwardly such that the distal end of the arm travels upward on the sidewall. In an exemplary embodiment, the distal end is a round, optinallya wheel.

Figure 2A:
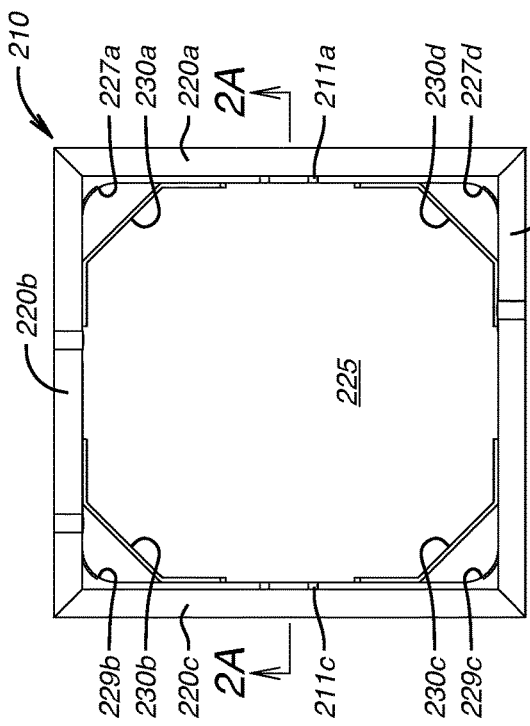
FIG. 2A is a cross section view of the quadrilateral embodiment of FIG. 1 taken along the lines 2A-2A of FIG. 2.
Figure 1:
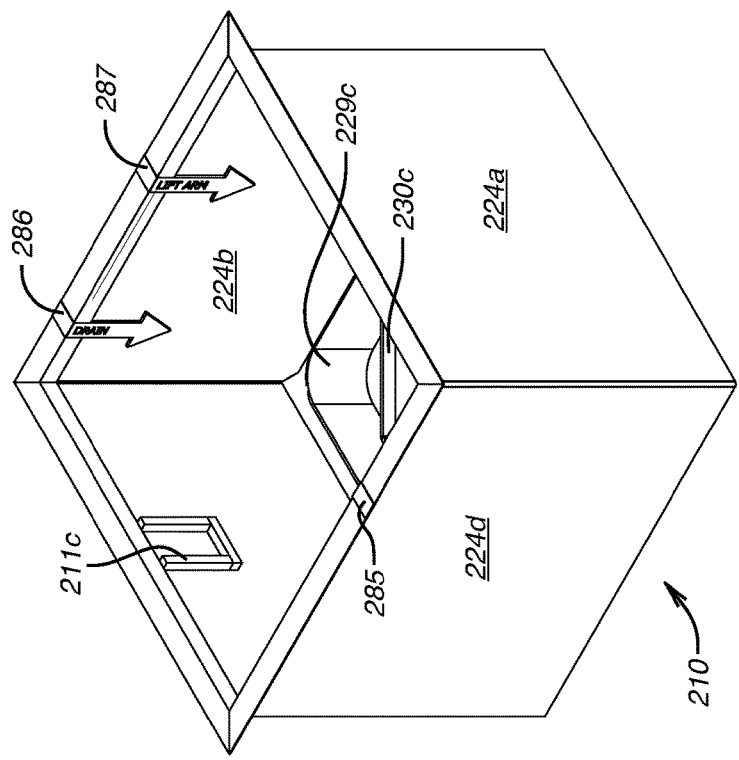
FIG. 1 is an isometric view of a quadrilateral (four sided) support structure for receiving the embodiment of FIG. 5
Figure 14:
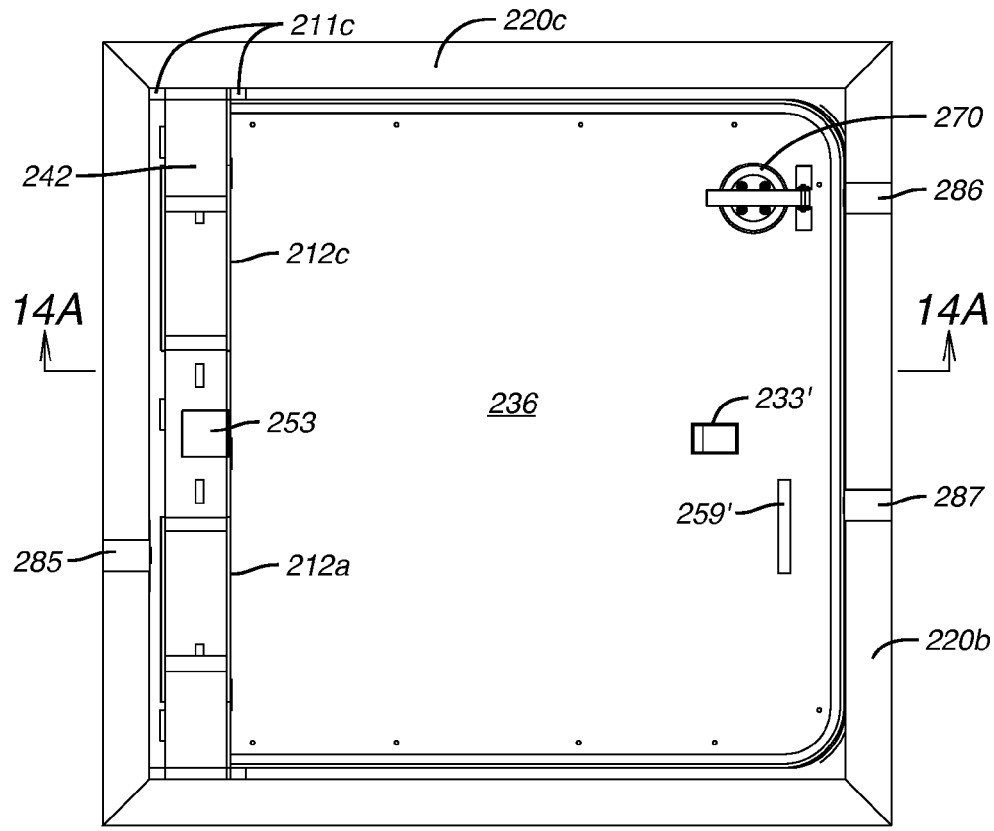
FIG. 14 is a top plan view of a single panel assembly received in a quadrilateral support showing the panel deployed in a passage closed position.
Figure 15:
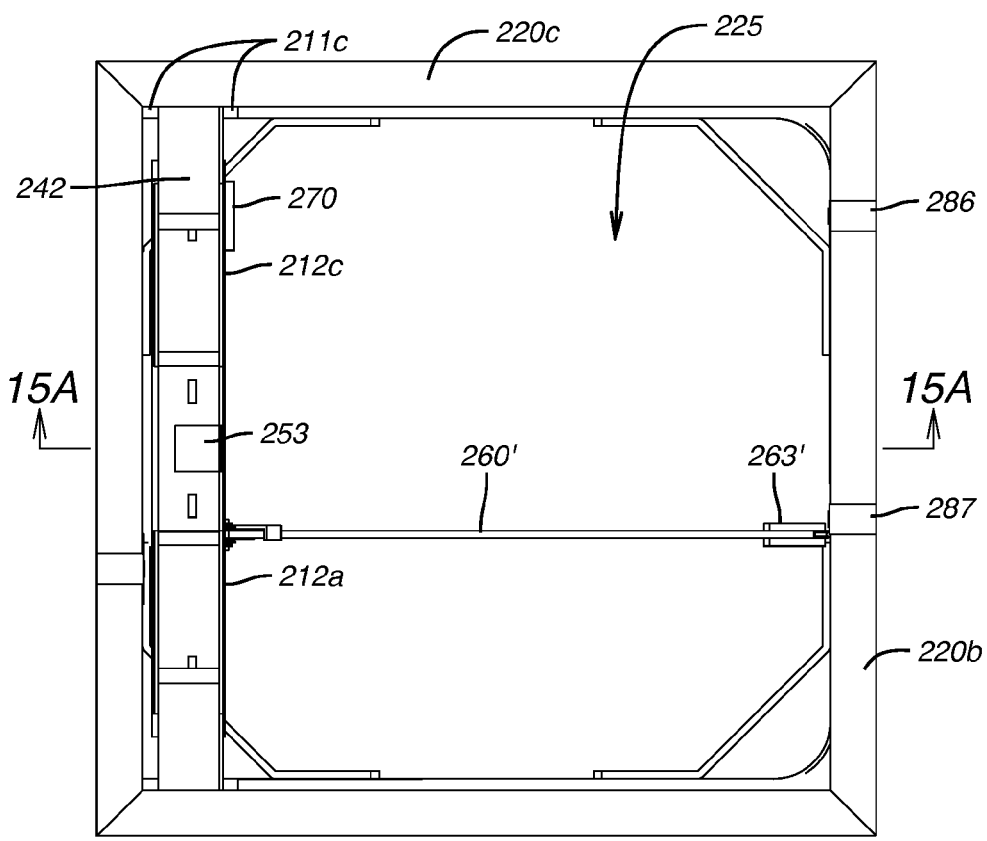
FIG. 15 is a top plan view of a single panel assembly received in a quadrilateral support showing the panel completely raised to home position
Figure 15A:
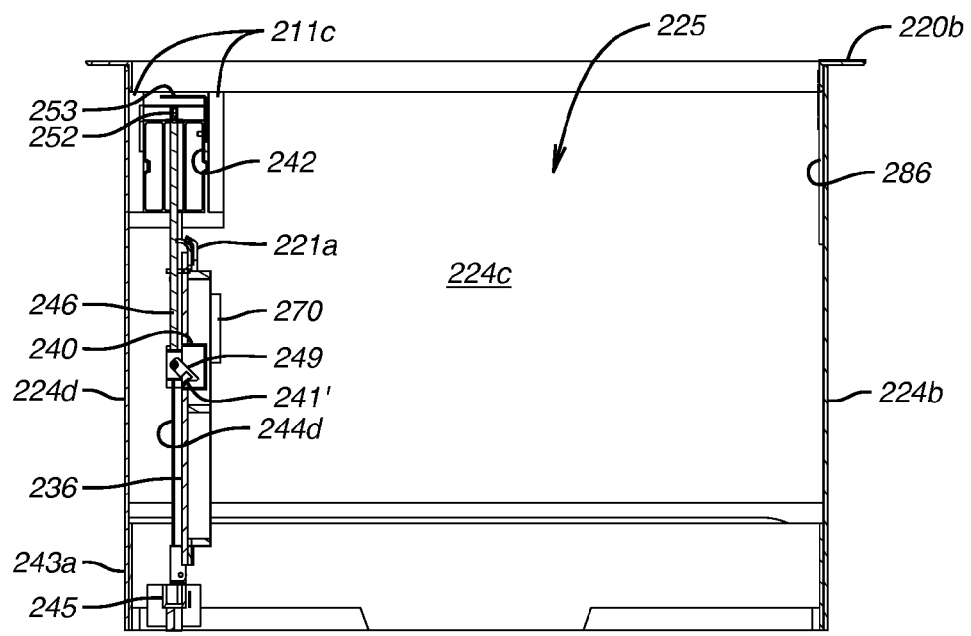
FIG. 15A is a cross sectional view of the embodiment of FIG. 15 taken along the line 15A-15A of FIG. 15.

Turning now to the drawings, they show exemplary embodiments of an apparatus for preventing downward flow of surface water into an underground ventilation duct fluidly communicating through a ventilation shaft to a rectilinear atmospheric opening of the shaft. FIGS. 1-12A show exemplary embodiments having a pair of panels. FIGS. 14-15A show exemplary embodiments having a single panel. Referring initially to FIGS. 1, 2 and 2A, an exemplary embodiment comprises a support embodied in a quadrilateral or four-sided box 210 inclusive of sidewalls 224 (224*a*, 224*b*, 224*c*, 224*d*) having at the upper extent of the sidewalls flanges 220 (220*a*, 220*b*, 220*c*, 220*d*) transverse to the sidewalls 224 for extension over a top of walls of a ventilation shaft for suspension of box 210 vertically in the shaft to define a passage 225 between top opening 226 and bottom opening 228 of box 210 for fluid communication of a ventilation duct up through box 210 to an atmospheric opening above top opening 226. Cradles 211*a*, 211*c* are formed in the upper sides of opposing sidewalls 224*a* and 224*c* respectively. The apparatus shown is suitable as a drop in solution to sealing vent passages from storm waters by lowering it into a ventilation shaft to rest on walls of the shaft. In place, a grating (not pictured) covers top opening 226. In normal operation, operator access to the interior of box 210 is through the grating.

Although an exemplary embodiment as described herein employs a quadrilateral box support 210, some locations may allow use of a support in the shape of a hollow cylinder also having stops 230 proximate a bottom opening of the support, and this form is comprehended within the scope of the invention.

Stops 230*a*, 230*b*, 230*c* and 230*d* in the form of corner braces in box 210 are within and connected to sidewalls 224 proximate bottom opening 228 and do not obstruct passage 225. Adjacent sidewalls include a base 227 having rounded corners 227*a*, 227*d* above respective stops 230*a*, 230*d*, and a base 229 having rounded corners 229*b* and 229*c* above respective stops 230*b*, 230*c*. Rounded corners 227*a*, 227*d* and 229*b*, 229*c* have a round corner radius of curvature.

Figure 3:
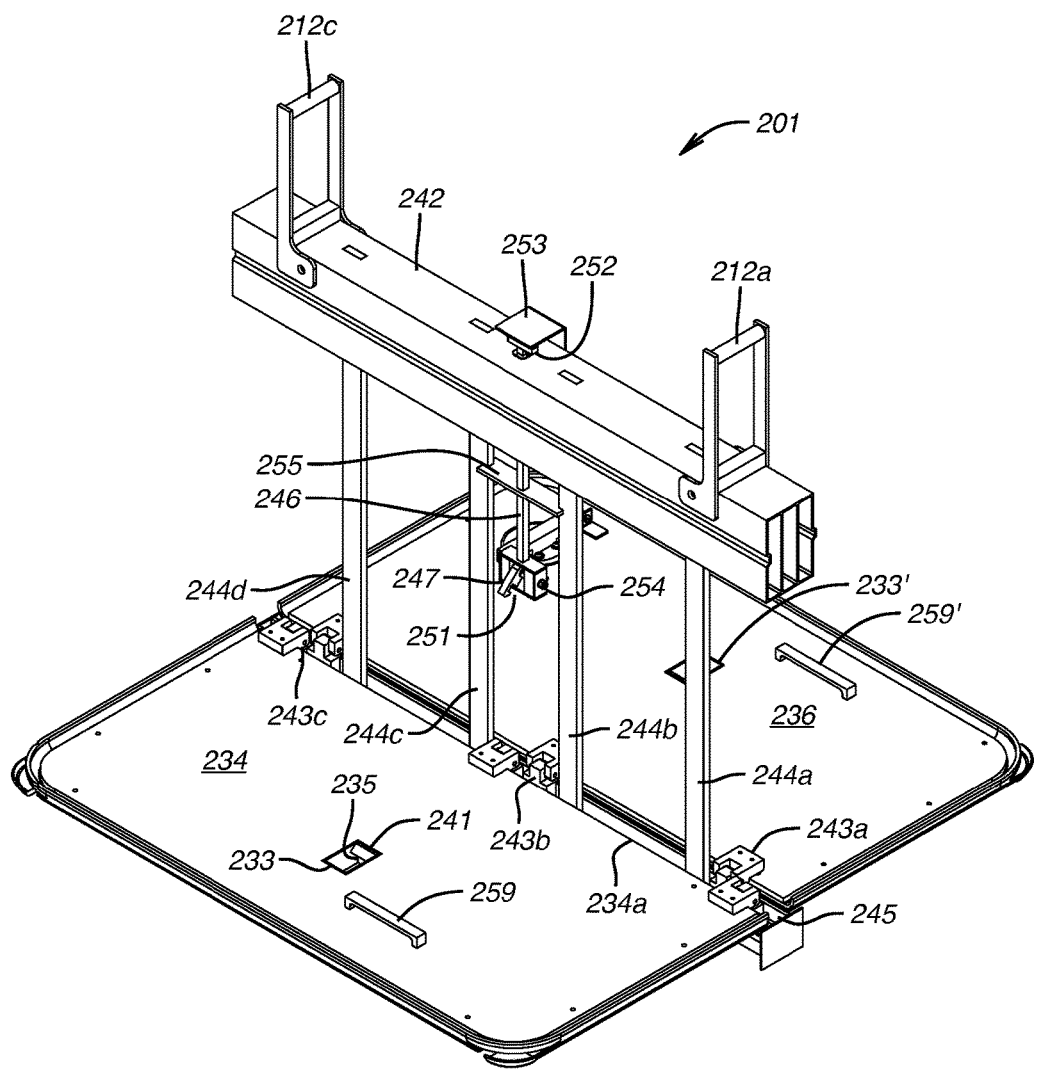
FIG. 3 is an isometric top view of a panel assembly with panels in lowered position.
Figure 4:
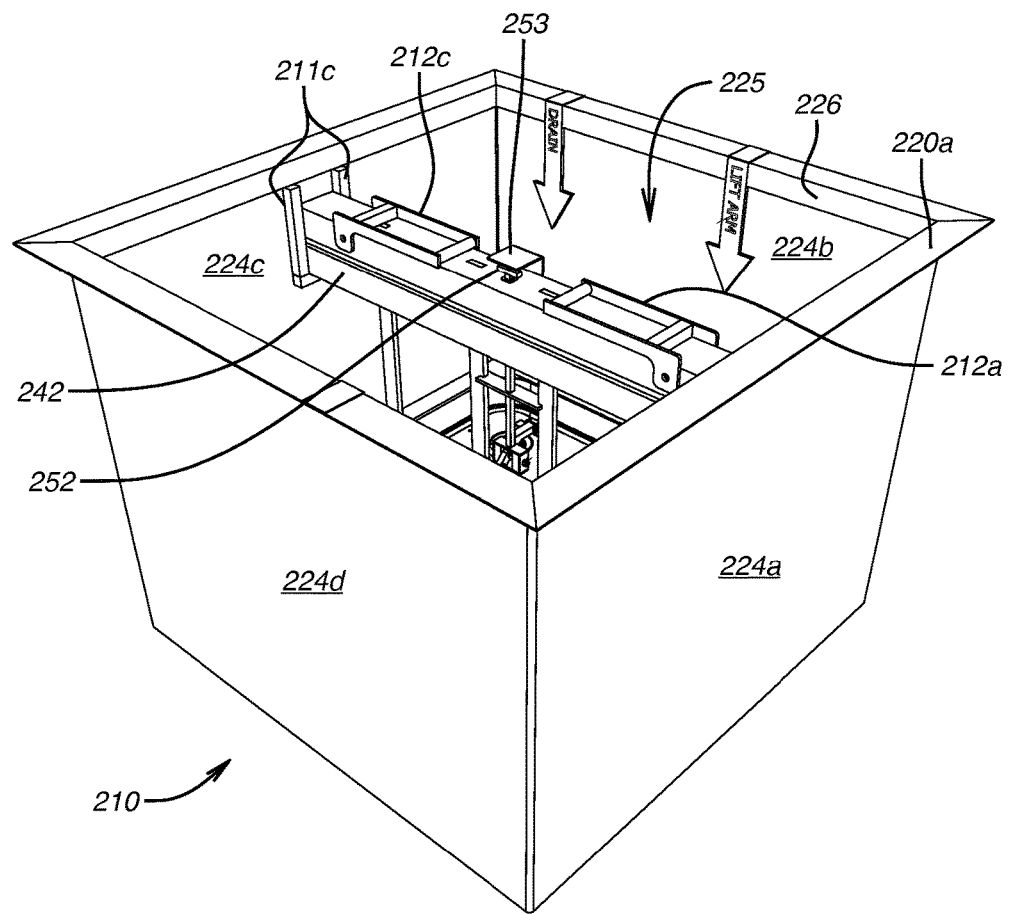
FIG. 4 is an isometric view of the panel assembly of FIG. 1 received in the a quadrilateral support.

Referring now to FIGS. 3 and 4, a beam 242 comprising extruded tubing unobstructively horizontally spans across passage 225 and connects to opposed sidewalls 224*a*, 224*c* of box 210 proximate top opening 226. Beam 242 is lodged in cradles 211*a*, 211*c*, and is conveniently lowered into channels 211*a*, 211*c* by operators holding beam foldable handles 212*a*, 212*c*. Beam 242 and straps 244 described below comprise a suspension member for equipment described below. Beam 242 and its attached equipment can be lowered into place as a complete assembled unit 201 after box 210 is installed in ventilation shaft resting on flanges 220. This assembled unit 201 can be removed from box 210 for servicing by withdrawing beam 242 from channels 211*a*, 211*c* by means of handles 212*a*, 212*c*.

Although an exemplary embodiment as described employs a suspension member comprising a beam 242 and straps 244 for supporting equipment described below, the scope of the invention is not limited to such embodiment. A suspension member may be employed other than beam 242 and straps 244, for example a suspension member can be a single unitary vertically extending solid or fenestrated plate suspending the hinged panels the same as beam 242 and straps 244. An advantage of the described beam 242 and straps 244 is a lighter weight imposing a lesser load on flanges 220 than a solid plate, but a fenestrated plate would serve a lighter load advantage as well, albeit likely a more costly element.

Referring particularly to FIG. 3, a hinge mounting member 245 unobstructively horizontally spans across passage 225 the same as beam 242 connected by a plurality of straps 244*a*, 244*b*, 244*c*, 244*d* to beam 242. Lodged in cradles 211*a* and 211*c*, beam 242 and hinge mounting member 245 spanning between sidewalls 224*a*, 224*c* are centered in passage 225 of box 210 with beam 242 directly over hinge mounting member 245. Hinge mounting member 245 mounts and supports a plurality of hinge members 243. Hinge members 243 each comprise a stationary member 243*b*, a movable member 243*a* and a hinge pin 243*c* that interconnects stationary member 243*b* and movable member 243*a*. Stationary member 243*b* connects to hinge mounting member 245.

A pair of opposing panels 234, 236 each having proximal and distal portions, respectively 234*a*, 234*b* and 236*a*, 236*b*, are connected at proximal portions 234*a*, 236*a* by moveable hinge members 243*a* to stationary hinge members 243*b* and thereby to a hinge mounting member 245 and from hinge mounting member 245 via straps 244*a*, 244*b* to beam 242. The connection of moveable hinge members 243*a* to the proximal portions 234*a*, 236*a* of panels 234, 236 on hinge pins 243*c* forms respective pivot axes of panels 234, 236 for vertical rotation of panels 234, 236. Panels 234, 236 rotate in directions opposite each other from or to an upright home position tucked under beam 242. Rotation of the panels upwardly (one clockwise, the other counterclockwise) to home position is effected manually as further described below. The home position of the panels tucked under beam 242 does not occlude passage 225. Panels 234, 236 in rotation fall solely under the gravitational impetus of their own weight from the upright home position to a lower passage closing position (indicated generally by reference numeral 215) where further rotation is prevented by stops 230*a*, 230*b*, 230*c*, 230*d* and 230*e*. Each panel has a profile that closes the passage when the panels gravitationally rotate to the passage closing position.

Referring now to FIG. 4, beam 242 comprising extruded tubing unobstructively horizontally spans across passage 225 and connects to opposed sidewalls 224*a*, 224*c* of box 210 proximate top opening 226. Beam 242 is lodged in cradles 211a, 211c, and is conveniently lowered into cradles 211a, 211c by operators holding beam foldable handles 212a, 212c. Beam 242 and straps 244 described below comprise a suspension member for equipment described below. Beam 242 and its attached equipment can be lowered into place as a completely assembled unit after box 210 is installed in ventilation shaft resting on flanges 220. This assembled unit can be removed from box 210 for servicing by withdrawing beam 242 from cradles 211a, 211c by means of handles 212a, 212c.

Although an exemplary embodiment as described employs a suspension member comprising a beam 242 and straps 244 for supporting equipment described below, the scope of the invention is not limited to such exemplary embodiment. A suspension member may be employed other than beam 242 and straps 244, for example a suspension member can be a single unitary vertically extending solid or fenestrated plate suspending the hinged panels the same as beam 242 and straps 244. An advantage of the described beam 242 and straps 244 is a lighter weight imposing a lesser load on flanges 220 than a solid plate, but a fenestrated plate would serve a lighter load advantage as well, albeit likely a more costly element.

Figure 5:
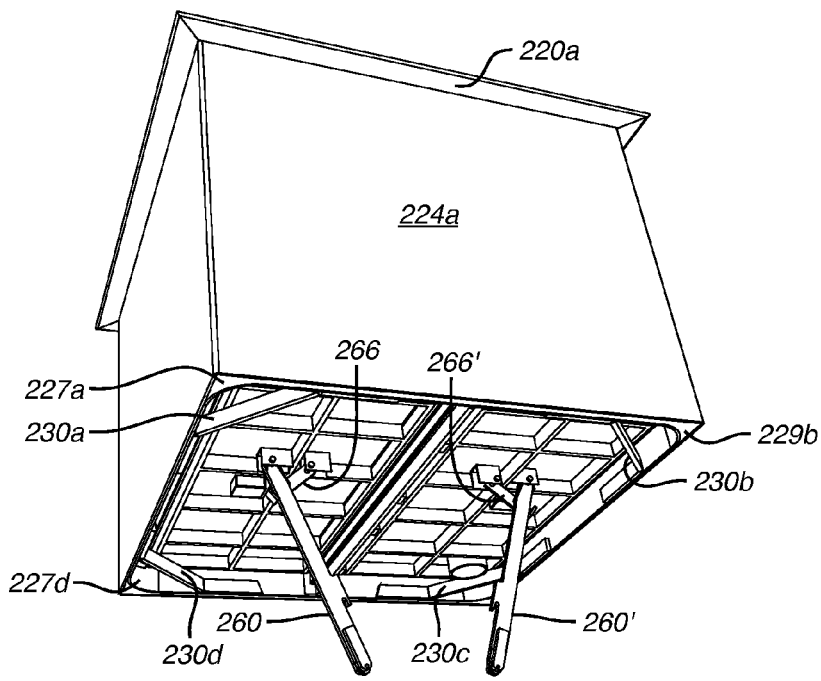
FIG. 5 is an isometric view of the embodiment of FIG. 4 presenting a view of the bottom of the embodiment showing lift arms with stays engaged.
Figure 5A:
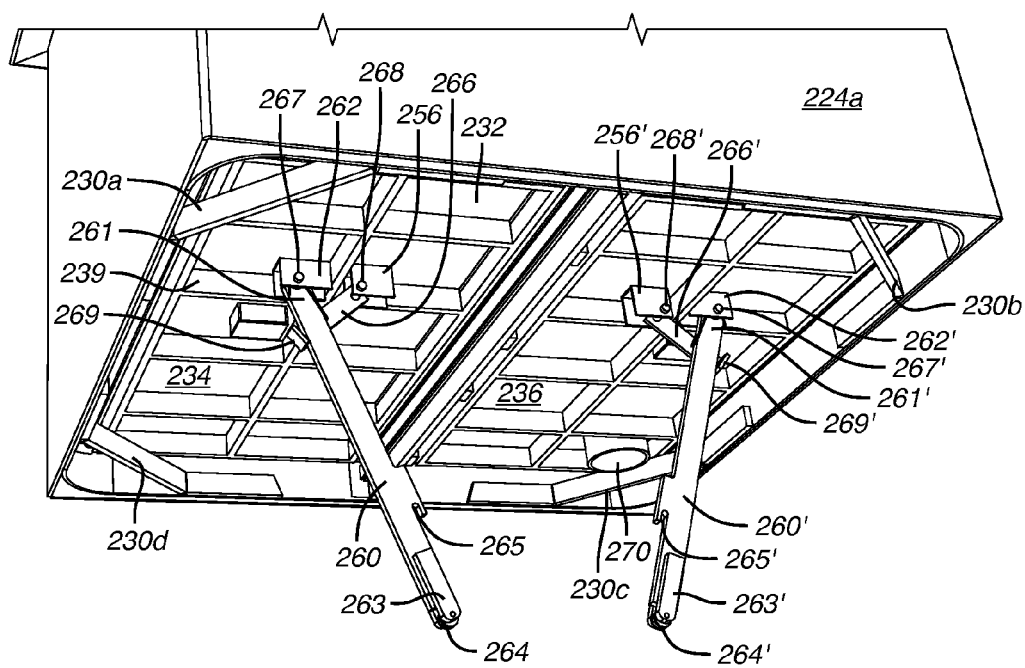
FIG. 5A is an enlarged view of the bottom part of FIG. 3.
Figure 6:
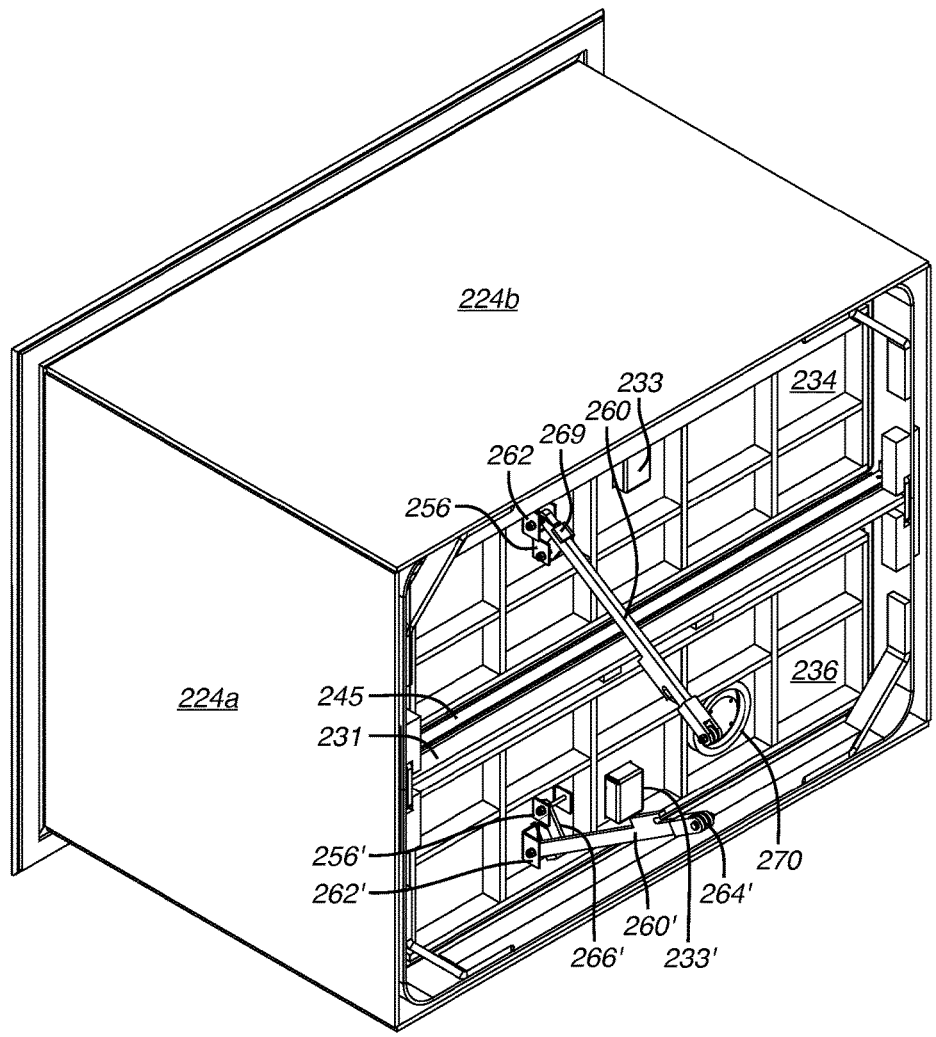
FIG. 6 is a perspective bottom view of the embodiment of FIGS. 4 and 5 showing lift arms with stays engaged.

Referring to FIGS. 3, 5-5AB, panels 234, 236 have a top side plate 238 and a bottom side 232. Bottom side 232 is crisscrossed with internal cross braces 237, 239 for rigidity. The distal portions of the panels have rounded corners 219 with a radius of curvature substantially the same as the radius of curvature of the sidewall corners 229a, 229b, 229c and 229d they sweep when rotating to the passage closing position. The panels include peripheral distal and lateral seals 221, 222 for sealing the passage in the passage closing position, seals 221a, 222a for panel 234 and seals 221b, 222b for panel 236. A gasket seal 223 (223a for panel 234, 223b for panel 236) spans the proximal ends of bases of panels 234, 236 below pin 243c and seals bottom opening 228 at the proximal ends of panels 234, 236 when the panels are in the passage closing position. At least one of the panels, such as panel 236 is fitted with a drain 270 intermediate the proximate and distal ends of the panel, as shown in FIGS. 2A and 2B.

In the exemplary embodiment illustrated in FIG. 3 each panel 234, 236 topside 238 includes a recess 233 or 233'. The recess contains a panel holder latch catch 235 for panel 234, 235' for panel 236 (latch catch 235' is shielded from view in FIG. 1 but will be understood to be the same and operate the same as latch catch 235). A panel holder 240 latch 247 for panel 234, 249 for panel 236 (latch 249 is shielded from view in FIG. 1 but will be understood to be the same and operate the same as latch 247.) Panel holder 240 inclusive of latches 247, 249 is carried by the suspension member 242. Latches 247, 249 are vertically pivotal on a horizontal axis 254 at a proximate end of the latches. The latches axis 254 is parallel to the panel axes of pins 243c paralleling either side of hinge mounting member 245. Each panel holder latch 247, 249 pivotally extends externally from latch axis 254 distally to an inferior return having a sloped surface ending at an inset notch 251, 251'. Recesses 233, 233' and latches 247, 249 are horizontally and vertically aligned with each other such that when panel 234, 236 is rotated vertically upward, the inferior return of latch 247, 249 is brought into sliding contact with ramp 241, 241' carried by the panel and the sloped surface of the latch slides on ramp 241, 241' until inset notch 251, 251' passes over latch catch edge, 235, 235', capturing latch 247, 249. This capture holds panel 234, 236 in home position 213.

Panel holder 240 is movably suspended from suspension member 242 by a rod 246 connected to panel holder 240. Rod 246 is mounted through beam 242 slideably translatable through a brace 255 fastened between straps 244b, 244c and terminates above beam 242 at T-handle 252 under a cover 253 sheltering T-handle 252 from pedestrian view through a grating covering quadrilateral support 210. Cover 253 reduces if not avoiding gratuitous tampering with the apparatus and unwanted deployment of the panels by mischief makers.

Rod 246 and T-handle 252 comprise a panel releaser. The T-handle provides convenient holding, such as by a projection or hook of a reach tool that can be vertically inserted through a small opening in a grating covering support 210 to reach under cover 253 and hook T-handle 252 for lifting panel holder 240. Lifting rod 246 by T-handle 252 moves panel holder 240 upwardly to cause moveable members 247, 249 to lose their hold on catch 241, 241' and release panels 234, 236, allowing panels 234, 236 to rotationally gravitationally fall solely by impetus of their own weight from the upright home position 213 to the lower passage closing position 215.

Figure 10:
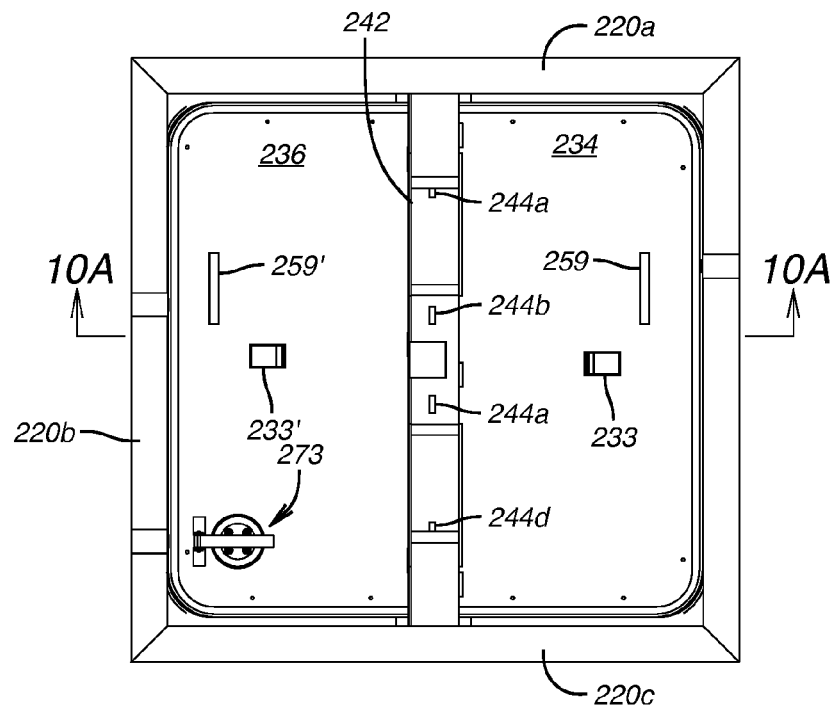
FIG. 10 is a top plan view of the embodiment of FIG. 4.
Figure 10A:
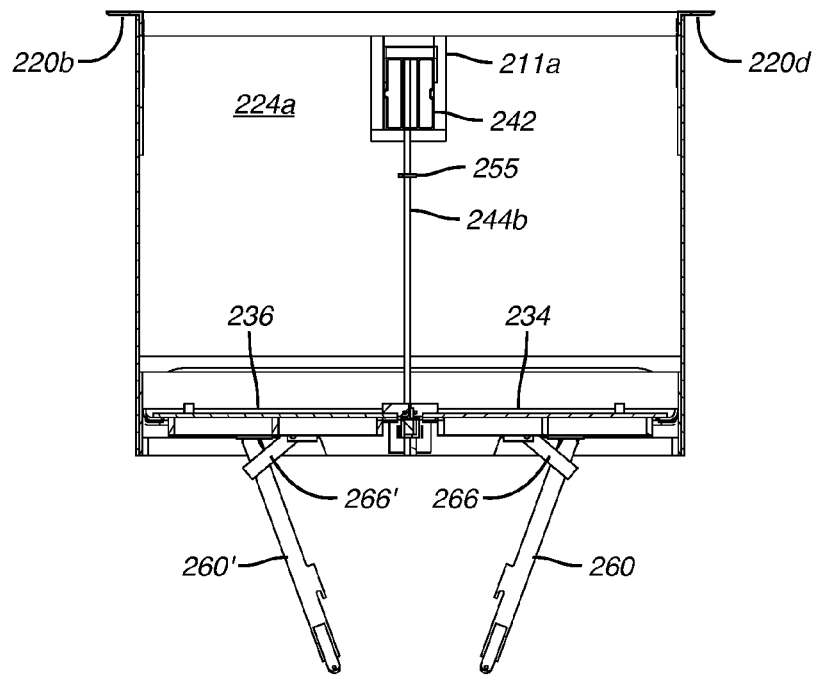
FIG. 10A is a cross sectional view of the embodiment of FIG. 9 taken along the line 10A-10A of FIG. 10 showing lift arms with stays engaged.
Figure 11:
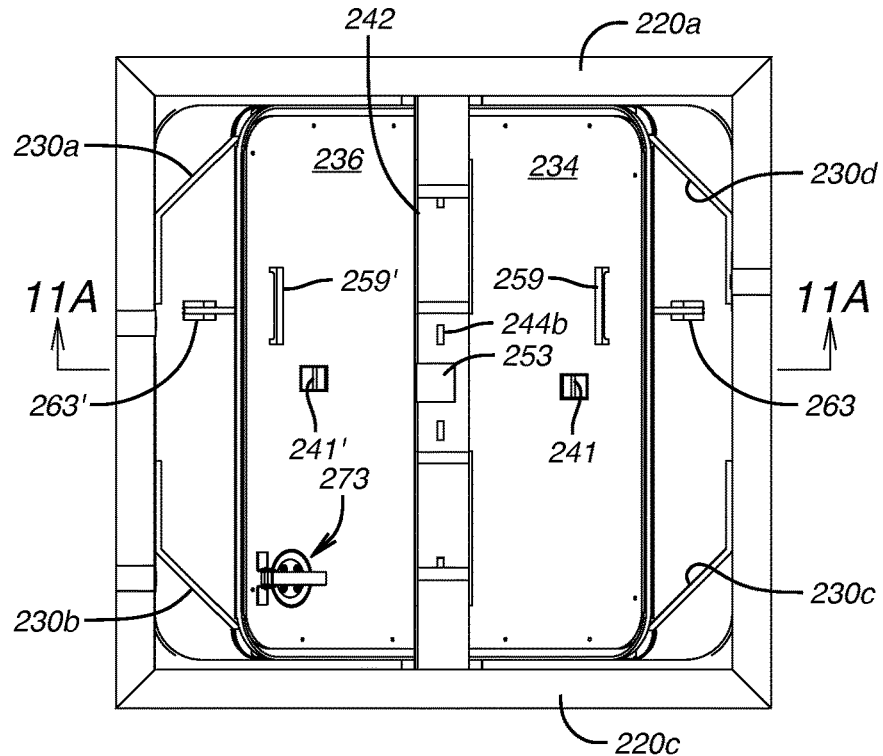
FIG. 11 is a top plan view of the embodiment of FIG. 10 showing the panels partially raised and the lift arms with stays released.
Figure 11A:
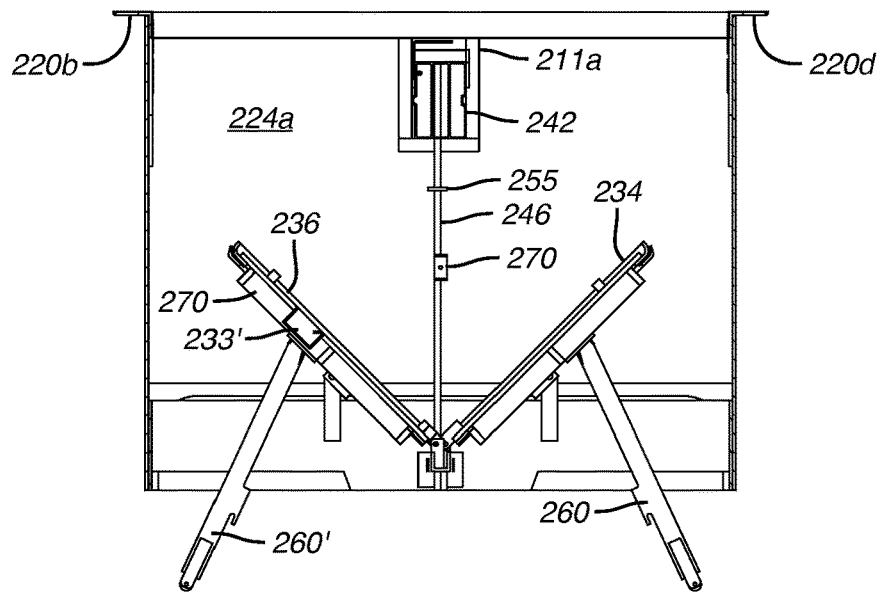
FIG. 11A is a cross sectional view of the embodiment of FIG. 10 taken along the line 11A-11A of FIG. 11 showing the lift arms with the stays released.

Panels 234, 236 are provided with structure to raise the panels manually to home position 213. Each panel 234, 236 has a handle 259, 259' on its top side 238, 238' remote from the pivot axes of pins 243c of the hinge members 243 to which the proximate ends 234a, 236a of the panels 234, 236 are connected. A tool such as hooking tool 290 can be used by an operator and inserted through a grating over box 210 to grasp handle 259, 259' to lift panel 234, 236. FIGS. 11 and 11A depict panels 234, 236 partially raised from the resting position shown in FIGS. 10 and 10A. The lifting operation however must be performed through a small opening in the grating that covers the support 210. The opening not only is small but it is deep, limiting operation to only vertical manipulation. Lifting panel 234, 236 with a tool 290 to rotate the panel upward fully to home position 213 thus becomes difficult as home position is approached, for very little lateral force can be applied. Each panel 234, 236 is provided with an assist mechanism that allows straight vertical movement manipulation through a small opening in the grate to push laterally against panel 234, 236 to facilitate full closure to home position 213.

This mechanical assist mechanism comprises a lift arm 260 for panel 234 and a lift arm 260' for panel 236. Referring particularly to FIGS. 5 and 5A, each lift arm 260, 260' has a proximal end 261, 261' pivotally connected by pivot pin 267 to a bracket 262, 262' fastened to a brace cross member 239 on the bottom side 232 of the panel 234, 236, and each has a pendent distal end 263, 263', optionally comprising a round, which in this embodiment is a terminal wheel 264, 264', but may be a rounded terminus of the end 263, 263'. Each lift arm 260, 260' is of a dimension to contact its distal end 263, 263', in this embodiment, wheel 264, 264', with the opposing lateral sidewalls 224a, 224c parallel to beam 242 when distal end 263, 263' pivots outwardly and upwardly inside support box 210.

Figure 7:
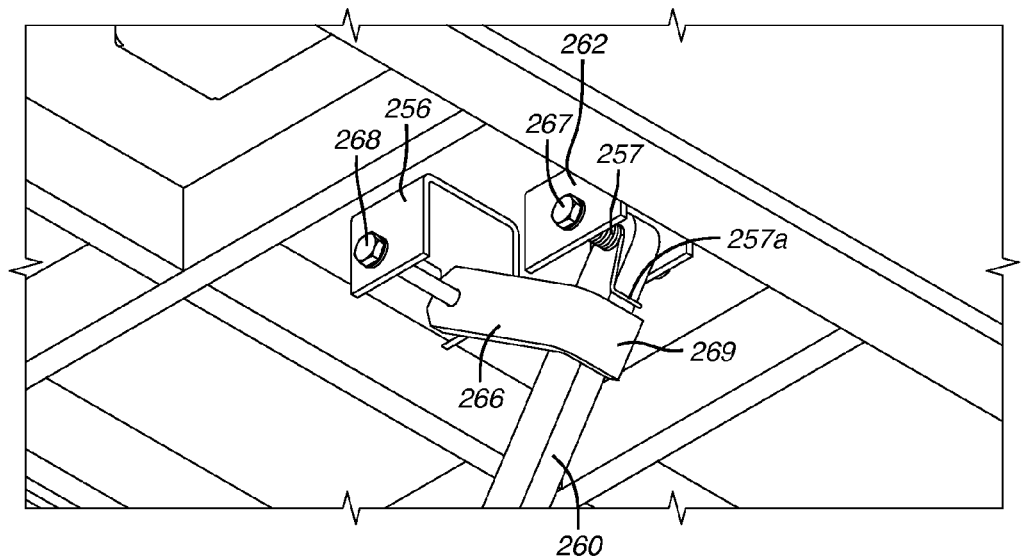
FIG. 7 is a rear view of the stay and lift arm of the embodiment of FIG. 5.
Figure 8:
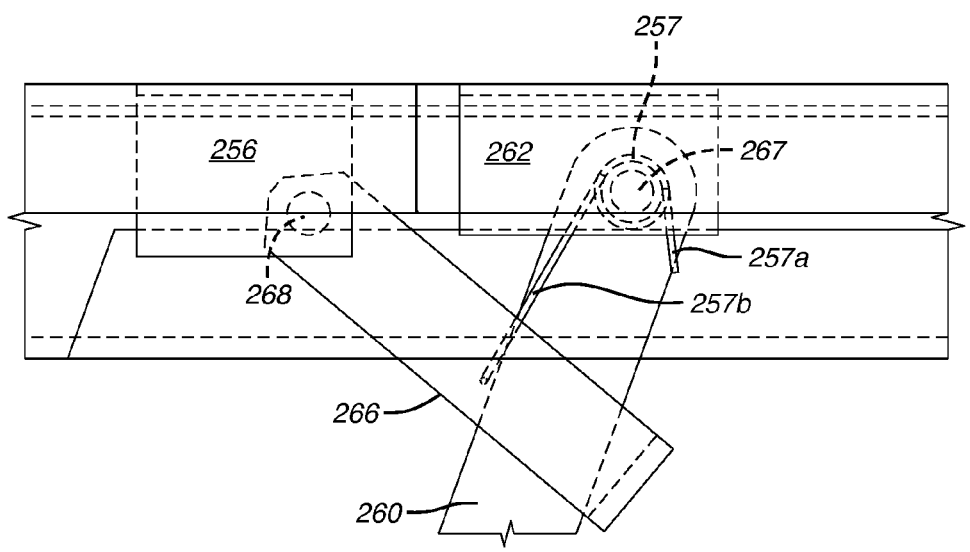
FIG. 8 is a shadow view of the arrangement of lift arm and stay of FIG. 7.
Figure 9:
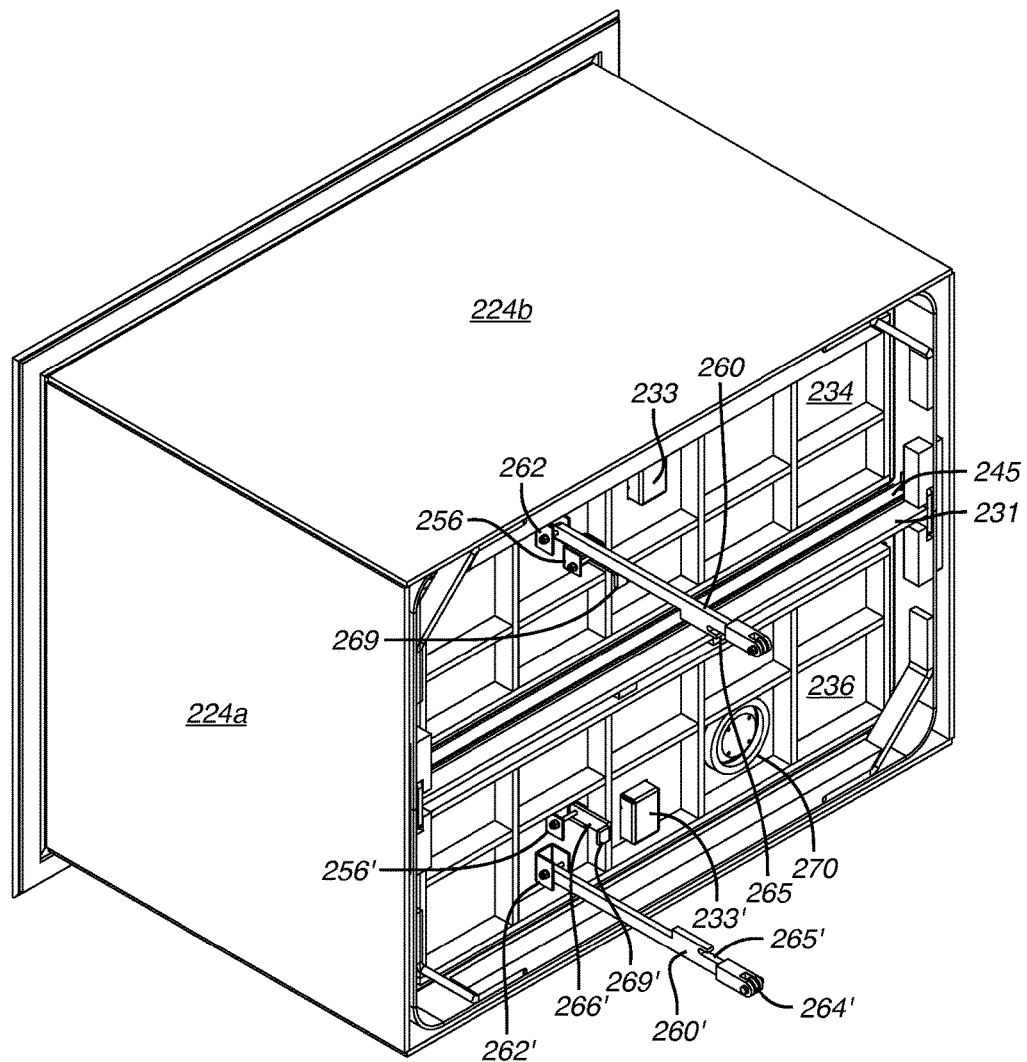
FIG. 9 is a perspective bottom view of the embodiment of FIGS. 4 and 5 showing lift arms with stays released.

Referring to FIGS. 7 and 8, lift arms 260, 260' are spring biased to extend the distal ends 263, 263' rotationally outwardly and upwardly, by means of force expressed by a spring 257, 257' centrally coiled around lift arm pivot pin 267, 267', with a proximal short end 257a extending at a right angle across the superior side of lift arm 260, 260' and a distal long end 257b extending at a right angle across the inferior side of lift arm 260, 260'.

Referring to FIG. 5A, 6-8, 10A, lift arms 260, 260' are restrained from spring biased extension by stays 266, 266' pivotally connected at an upper end by pivot pin 268, 268' to a bracket 256, 256' fastened to brace cross member 239 adjacent the pivotal attachment of the proximal ends of lift arms 260, 260'. The lower end 269, 269' of stays 266, 266' is outwardly angled toward lift arms 260, 266' to extend across and releasably contact the proximal superior side of lift arms 260, 260'. The spring bias of lift arms 260, 260' presses lift arms 260, 260' against stays 266, 266' to maintain the restraining contact. The restraint imposed by stays 266, 266' enables beam 242 and the equipment suspended from beam 242 by straps 244a-244d to be lowered into box 210 for support by the cradles 211a, 211c of box 210 with the biased lift arms 260, 260' tucked inwardly so as to not interferingly contact the lateral sidewalls 224b, 224d parallel to beam 242 during the drop in installation of the beam and beam supported equipment.

Using a reach tool such as hooking tool 290 vertically lowered though a grate small opening, the lower ends 269, 269' of stays 266, 266' can be slipped off lift arms 260, 260' to allow the spring biased lift arms 260, 260' to extend outwardly and upwardly under the force expressed by of spring 257. See FIG. 9.

Figure 12:
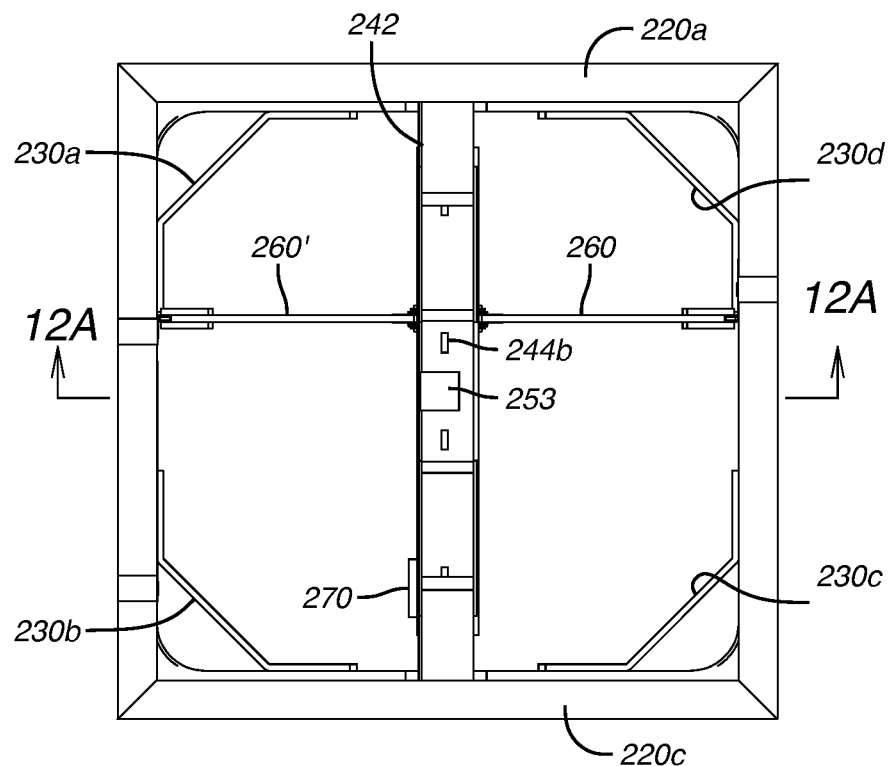
FIG. 12 is a top plan view of the embodiment of FIG. 10 showing the panels completely raised and the lift arms relaxed after deployment completing rotation of the panels to home position.
Figure 12A:
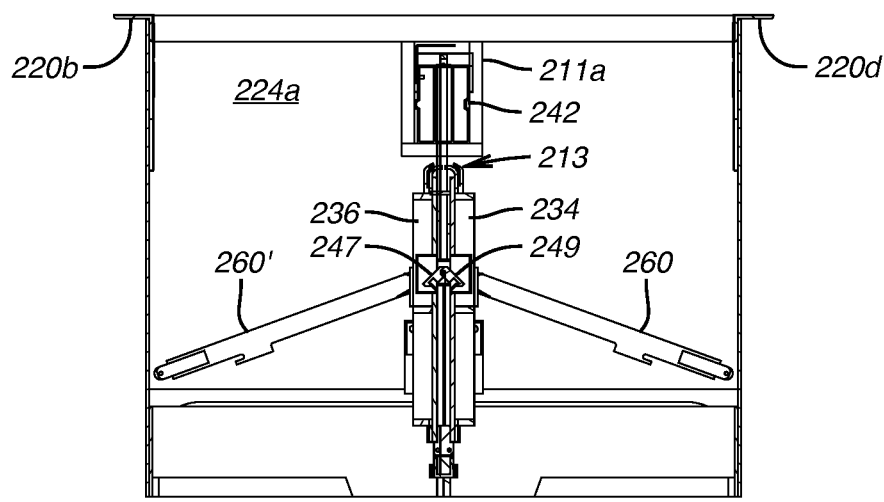
FIG. 12A is a cross sectional view of the embodiment of FIG. 10 taken along the line 12A-12A of FIG. 12 showing the panels completely raised and the lift arms relaxed after deployment completing rotation of the panels to home position.
Figure 13C:
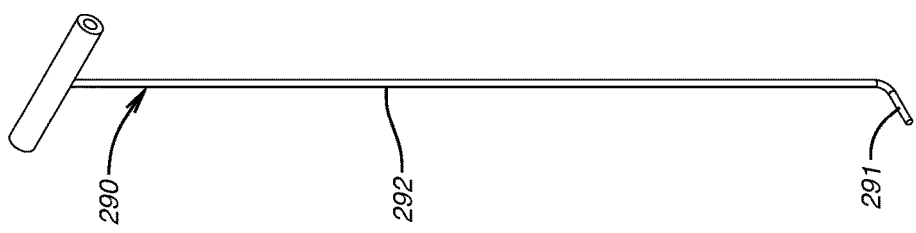
FIGS. 13A, 13B and 13C are respectively side, frontal and perspective views of a tool for manual raising panel handle 259, 259' and lift arms 260, 260' of embodiments of the invention.
Figure 13B:
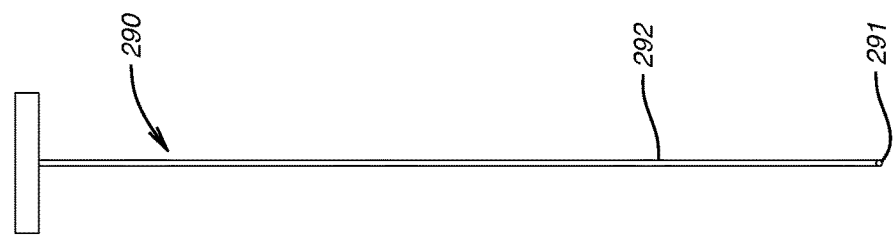
Figure 13A:
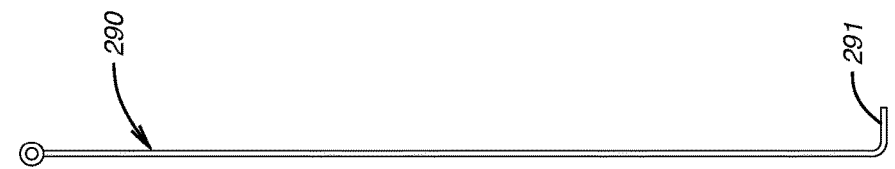

Each lift arm 260, 260' has a configuration at an inferior portion of the arm, such a relief slot 265, 265', for engagement by a hook 291 of a second hooking reach tool 290 lowered though a grate small opening into the box support 210. Referring to FIGS. 11-11A, with panels 234, 236 partially raised by a first hooking tool such as tool 290 and lift arms 260, 260' released from stays 266, 266', the extended outwardly lift arms 260, 260' can be engaged by snagging slot 266, 266' using the second hooking tool 290. With lift arm 260, 260' thus engaged while panel 234, 236 is incompletely lifted using a first hooking reach tool 290, an operator can next withdraw the first hooking tool that pulled up the panel 234 or 236 being lifted, holding that panel partially lifted by interference of the distal edge of the panel with the shank 292 of the second tool 290. This removes the first hooking tool from a position where it would interfere with closing of panel 234, 236 to full upright home position 213 by operation of lifting arm 260, 260'. The operator then vertically pulls the shank 292 of second tool 290 up though the small opening on the grate. This pivots the engaged lift arm 260 or 260' upward such that the distal end 263, 263' of the arm, here wheel 264, 264', travels upward on sidewall 224a, 224c. Referring to FIGS. 12 and 12A, vertical pull of tool 290 continues until proximal end 261, 261' of lift arm 260, 260' exerts sufficient lateral force against its connected panel 234 or 236 to push panel 234, 236 to completed rotation into home position 213. Referring to FIGS. 12 and 12A, in nearing completion to home position, the panel 234, 236 with included recess 233, 233' and ramp 241 have engaged the slope of distal return 248 of latches 247, 249 and inset notch 251 has slide past ramp latch catch edge 235, capturing panel 234, 236 against panel holder 240 with panels 234, 236 essentially vertically disposed. The hooking tool 290 is the fully vertically withdrawn though the small opening in the grate.

Referring now to FIGS. 14-15A, another exemplary embodiment employs a single panel. Components in the single panel exemplary embodiments that are the same as in the exemplary pair of panels embodiments have the same reference numbers as in the exemplary pair of panels embodiments. The single panel exemplary embodiment, as with the other exemplary embodiments, assumes a rectilinear atmospheric opening of a vertical ventilation shaft and allows ventilation as usual through the shaft to an underground ventilation duct fluidly communicating through the ventilation shaft to an atmospheric opening at a grating over the shaft and on threat of flooding is operable to prevent downward flow of surface water into the underground ventilation duct. The single panel exemplary embodiment, like the pair of panels exemplary embodiments comprises a support embodied as a four-sided vertical box open at bottom and top to define a passage 225 between top and bottom openings of the box support. Some details are omitted for simplicity of exposition but will be understood from descriptions of the pair of panels exemplary embodiments. Exemplary flanges, e.g. 220b, 220c horizontally extend and rest atop vertical walls of a ventilation shaft (flanges 220a, 220d are not indicated by reference numerals in FIGS. 14-15A but are understood from the prior embodiments). Support box sidewalls 224b, 224c and 224d are visible in the sectional views FIGS. 14A and 15 A (sidewall 224a will be understood from descriptions of the embodiments of the pair of panels. The four sidewalls 224a, 224b, 224c, 224d of box 218 vertically fit inside the four vertical ventilation shaft walls, as in the pair of panels exemplary embodiments. Stops like stops 230a, 230d in the pair of panels exemplary embodiments are within and connected to sidewalls, respectively, 224a, 224b and 224a, 224d, proximate bottom opening like 229 in the exemplary embodiments of FIGS. 1-2A where they do not obstruct passage 225. Adjacent sidewalls include a base 227 having rounded corners 227a, 127d above respective stops 230a, 230d.

Cradles 211a, 211c are formed in the upper sides of opposing sidewalls 224a and 224c respectively, adjacent sidewall 224d. The apparatus shown is suitable as a drop in solution to seal vent passages from storm waters by lowering it into a ventilation shaft to rest on walls of the shaft. In place, a grating (not pictured) covers top opening 226. In normal operation, operator access to the interior of the support box is through the grating.

Referring now to FIGS. 14-15A, a beam 242 comprising extruded tubing unobstructively horizontally spans across passage 225 and connects to opposed sidewalls 224a, 224c of box 210 adjacent side wall 224d and proximate top opening 226. Beam 242 is lodged in cradles 211a, 211c, and is conveniently lowered into channels 211a, 211c by operators holding beam foldable handles 212a, 212c. Beam 242 and straps 244 comprise a suspension member. Beam 242 and its attached equipment can be lowered into place as a complete assembled unit after the support box is installed in ventilation shaft resting on flanges 220. This assembled unit can be removed from the support box for servicing by withdrawing beam 242 from channels 211a, 211c by means of handles 212a, 212c.

Figure 14A:
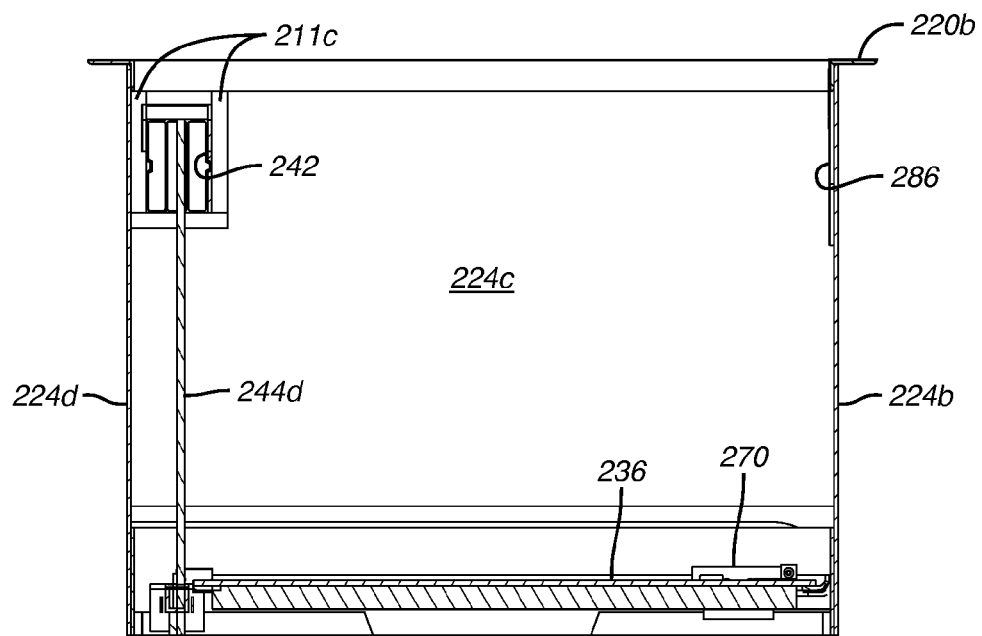
FIG. 14A is a cross sectional view of the embodiment of FIG. 14 taken along the line 14A-14A of FIG. 14.

Referring particularly to FIG. 15A, a hinge mounting member 245 unobstructively horizontally spans across passage 225 the same as beam 242 connected by a plurality of straps 244 to beam 242 (only 244d is seen in the sectional views of FIGS. 14A and 15A). Lodged in cradles 211a and 211c, beam 242 and hinge mounting member 245 spans between sidewalls 224a, 224c adjacent sidewall 224d with beam 242 directly over hinge mounting member 245. Hinge mounting member 245 mounts and supports a plurality of hinge members 243. The hinge members 243, as in the pair of panels exemplary embodiments, each comprise a stationary member 243b, a movable member 243a and a hinge pin 243c that interconnects stationary member 243b and movable member 243a, stationary member 243b connecting to hinge mounting member 245. In FIG. 15A, only moveable member 243a is referenced to avoid obfuscation of elements, A single panel 236 having proximal and distal portions, respectively (understood the same as 236a, 236b in the pair of panels exemplars) are connected at proximal portion 236a by moveable hinge members 243a to stationary hinge members 243b and thereby to a hinge mounting member 245 and from hinge mounting member 245 via straps 244a, 244b, 244c and 244d to beam 242, as in the pair of panels exemplars. The connection of moveable hinge members 243a to the proximal portion 236a of panels 236 on hinge pins 243c forms a pivot axis of panels 236 for vertical rotation of panel 236. Panel 236 rotates from or to an upright home position tucked under beam 242. Rotation of panel 236 upwardly (counterclockwise in the exemplary embodiment show) to home position is effected manually as further described below. The home position of panel 236 tucked under beam 242 does not occlude passage 225. Panel 236 in rotation falls solely under the gravitational impetus of its own weight from the upright home position to a lower passage closing position where further rotation is prevented by stops 230a, 230d. Each panel has a profile that closes the passage when the panels gravitationally rotate to the passage closing position.

In the embodiment illustrated in FIGS. 14-15A, panel 236 the same as panel 236 in the pair of panels exemplar includes a recess 233' that contains a panel holder latch catch 235'. A panel holder 240 latch 249 for panel 236. Panel holder 240 inclusive of latch 249 is carried by the suspension member 242. Latch 249 is vertically pivotal on a horizontal axis 254 at a proximate end of the latches. Latch axis 254 is parallel to the panel axes of pins 243c. Panel holder latch 249, like latch 247 in FIG. 6 pivotally extends externally from the latch axis distally to an inferior return having a sloped surface ending at an inset notch 251'. Recess 233' and latch 249 are horizontally and vertically aligned with each other such that when panel 236 is rotated vertically upward, the inferior return of latch 249 is brought into sliding contact with ramp 241' carried by the panel, and the sloped surface of the latch slides on ramp 241' until inset notch 251' passes over latch catch edge 235', capturing latch 249. This capture holds panel 236 in home position. As in the case of the pair of panels exemplar, the placement of the latch and latch catch can be reversed.

As in the case of the pair of panel exemplars, panel holder 240 is movably suspended from suspension member 242 by a rod 246 connected to panel holder 240. Rod 246 is mounted through beam 242 slideably translatable through a brace 255 fastened between straps 244b, 244c and terminates above beam 242 at T-handle 252 under a cover 253 sheltering T-handle 252 from pedestrian view through a grating covering quadrilateral support 210. Rod 246 and T-handle 252 comprise a panel releaser. The T-handle provides convenient holding, such as by a projection or hook of a reach tool that can be vertically inserted through a small opening in a grating covering support 210 to reach under cover 253 and hook T-handle 252 for lifting panel holder 240. Lifting rod 246 by T-handle 252 moves panel holder 240 upwardly to cause moveable members 247, 249 to lose their hold on catch 241, 241' and release panels 234, 236, allowing panels 234, 236 to rotationally gravitationally fall solely by impetus of their own weight from the upright home position 213 to the lower passage closing position 215.

As shown in FIGS. 14-15A, as in the case of the pair of panels exemplars, the single panel exemplary embodiment includes a lift arm 260' having a proximal end 261' pivotally connected by pivot pin 267 to the bottom side of panel 236 on a pivotation axis parallel to the hinge axis 243c and a distal end 263', the lift arm 260' being of dimension to contact distal end 263' with opposed lateral sidewall 224b when distal end 263' is pivoted upward inside sidewall 224b for exertion of lateral force onto connected panel 236 being raised with panel handle 259' to complete rotation of panel 236 into the home position.

As shown in FIGS. 14-15A, as also in the case of the pair of panels exemplars, the single panel exemplary embodiment includes a drain 270 in panel 236 intermediate the proximate and distal ends thereof, the drain 270 comprising a conduit 271 passing though panel 236. Conduit 271 has an opening 272 at the top side of panel 236 and a self actuating drain closure 273 comprising a plug 274 pivotingly rotatable on a drain plug axis 275 positioned between the drain conduit 271 and the distal end 236b of panel 236, the drain plug axis 275 paralleling the horizontal hinge axis 243c. Operatively, plug 274 is manually pivotable upwardly on the drain plug axis 275 to remove the plug from the drain opening 272 to drain water contained in the support box that has been prevented by panel 236 from entering a ventilation shaft when panel 236 is in the passage closing position. After drainage of the support box, as panel 236 is pivotally raised upward to the home position to allow resumption of ventilation between the atmospheric opening and the protected ventilation duct, plug 274 by gravitational impetus of its own weight automatically pivots downward to place the plug in the conduit opening 272. Consequently, drain conduit opening 272 is already closed when panel 236 gravitationally rotates downwardly to the passage closing position.

Having described illustrative examples of embodiments that incorporate concepts of the invention, those skilled in the art will be able to use these concepts as guided by these embodiments, and may form alternative variations that nonetheless embrace the concepts herein disclosed and still be within the scope of my invention as claimed in the claims that follow.

The invention claimed is:

1. Apparatus for allowing ventilation through a ventilation shaft to an underground ventilation duct fluidly communicating through the ventilation shaft to an atmospheric opening of the shaft and on threat of flooding operable to prevent downward flow of surface water into the underground ventilation duct, comprising a support comprising opposed lateral sidewalls for arrangement in said shaft defining a passage between top and bottom openings of the support for fluid communication of said ventilation duct up through said support to said atmospheric opening, one or more panels having proximal and distal ends, a top side, and a bottom side, said proximal end connecting with a horizontal hinge having a hinge axis perpendicular to said opposed lateral sidewalls for rotation of said one or more panels upwardly to an upright home position not obstructing said passage and rotation from said home position downwardly by gravitational impetus of the weight of such panel to reach a lower passage closing position, said one or more panels having a profile that closes said passage when said one or more panels gravitationally rotates to said passage closing position, a suspension member unobstructively horizontally spanning said passage supported on said opposed lateral sidewalls proximate said top opening and holding said one or more hinge connected panels in said passage proximate said bottom opening, a panel handle on said top side of said one of more panels for manually rotationally raising said one or more the panels from said passage closing position toward said home position, and a lift arm for each of said one or more panels, each lift arm having a proximal end and a distal end, said proximal end being pivotally connected by a pivot pin to said bottom side of said one or more panels on a pivotation axis parallel to said hinge axis, each said lift arm being of dimension to contact said distal end with one of said opposed lateral sidewalls when said distal end is pivoted upward inside said sidewall for exertion of lateral force onto the connected panel to which the lift arm is connected and that is being raised with said handle of said one or more panels, thereby to complete rotation of that panel into said home position.

2. The apparatus of claim 1 in which said lift arms are spring biased to force the distal ends rotationally outwardly and upwardly.

3. The apparatus of claim 2 in which a spring is centrally coiled around said lift arm pivot pin, the spring terminating on opposite first and second ends having a straight portion comprising a proximal shank and a distal portion bent at a right angle to the shank, the distal portion of the first end extending engagingly across an underside of the lift arm proximate the pivot pin and the distal portion of the second end extending engagingly across a topside of the lift arm more distant from the pivot pin than the distal portion of the first end.

4. The apparatus of claim 3 further comprising a stay for each pivot arm, a stay pivot pin adjacent said lift arm pivot pin pivotally connecting an upper end of each stay, a lower end of said stay angling outwardly toward an adjacent lift arm to extend across and releasably contact a proximal portion of said top side of the lift arm, said spring bias pressing said lift arms against said stays restrain said lift arms from rotation outwardly and upwardly.

5. The apparatus of claim 4 in which each said lift arm has a configuration at a bottom portion of said arm for engagement by a reach tool vertically lowered from said atmospheric opening to engage and pivotally pull the lift arm upwardly such that said distal end of the arm travels upward on said sidewall.

6. The apparatus of claim 5 in which said stay is releasable by a reach tool vertically lowered from said atmospheric opening, allowing the spring biased distal end of said lift arm to pivot laterally outward for capture by said reach tool vertically lowered from said atmospheric opening to engage and pivotally pull the lift arm upwardly such that said distal end of the arm travels upward on said sidewall.

7. The apparatus of claim 1 in which said support inclusive of said lateral sidewalls is sized to internally fit in said vertical shaft between said ventilation duct and said atmospheric opening, said support further comprising horizontal flanges transverse to said sidewalls for projecting across a top of said shaft to hang said support in said shaft.

8. The apparatus of claim 1 in which said atmospheric opening is cylindrical and said support comprises a hollow cylinder.

9. The apparatus of claim 1 in which said atmospheric opening is rectilinear and said support is quadrilateral.

10. The apparatus of claim 1 in which said suspension member comprises a single unitary vertically extending member.

11. The apparatus of claim 1 wherein said suspension member comprises a beam having vertically hung straps holding said horizontal hinge and said one or more panels connected to said horizontal hinge.

12. The apparatus of claim 1 in which said horizontal hinge comprises a hinge mounting member held by said suspension member and a plurality of hinge members mounted on said hinge mounting member.

13. The apparatus of claim 12 wherein each hinge member comprises a stationary member, a movable member and a hinge pin interconnecting the stationary and movable members, said stationary member connecting to said hinge mounting member, said moveable hinge member connecting to said proximal end of a said one or more panels.

14. The apparatus of claim 1 in which said shaft is vertical and said support inclusive of sidewalls is sized to internally fit in said shaft between said ventilation duct and said atmospheric opening, said support further comprising flanges transverse to said sidewalls for overlaying a top of said shaft to hang said support in said shaft, said sidewalls supporting said suspension member.

15. The apparatus of claim 14 wherein said one or more panels comprise a pair of panels and in which said atmospheric opening is rectilinear, said support is quadrilateral, and said suspension member comprises a beam supported centrally between said opposed lateral sidewalls for mounting of said panels in said passage for rotation of the panels in directions opposite each other from or to said upright home position not obstructing said passage, said beam having vertically hung straps holding said horizontal hinge and said panels connected with said horizontal hinge.

\* \* \* \* \*